United States Patent
Sinha et al.

(10) Patent No.: US 9,204,312 B2
(45) Date of Patent: Dec. 1, 2015

(54) METHOD FOR ADDING LEAF NODE TO MULTI-NODE BASE STATION

(71) Applicants: Arindam Sinha, Noida (IN); Somvir Dahiya, Noida (IN); Arvind Garg, Noida (IN); Sachin Jain, New Delhi (IN); Arvind Kaushik, Ghaziabad (IN)

(72) Inventors: Arindam Sinha, Noida (IN); Somvir Dahiya, Noida (IN); Arvind Garg, Noida (IN); Sachin Jain, New Delhi (IN); Arvind Kaushik, Ghaziabad (IN)

(73) Assignee: FREESCALE SEMICONDUCTOR, INC., Austin, TX (US)

( * ) Notice: Subject to any disclaimer, the term of this patent is extended or adjusted under 35 U.S.C. 154(b) by 163 days.

(21) Appl. No.: 14/092,881

(22) Filed: Nov. 27, 2013

(65) Prior Publication Data

US 2015/0146626 A1    May 28, 2015

(51) Int. Cl.
- *H04L 5/00* (2006.01)
- *H04W 16/18* (2009.01)
- *H04W 56/00* (2009.01)

(52) U.S. Cl.
CPC ............... *H04W 16/18* (2013.01); *H04L 5/008* (2013.01); *H04W 56/001* (2013.01)

(58) Field of Classification Search
CPC ....................................................... H04L 5/008
See application file for complete search history.

(56) References Cited

U.S. PATENT DOCUMENTS

| | | | |
|---|---|---|---|
| 7,571,338 B2 | 8/2009 | Osterling | |
| 7,680,149 B2 | 3/2010 | Liu | |
| 8,050,296 B2 | 11/2011 | Osterling | |
| 8,244,304 B2 | 8/2012 | Bommas | |
| 8,311,019 B2 | 11/2012 | Mori | |
| 2005/0063302 A1* | 3/2005 | Samuels et al. | 370/229 |
| 2005/0286507 A1* | 12/2005 | Sterling et al. | 370/363 |
| 2011/0032910 A1* | 2/2011 | Aarflot et al. | 370/335 |
| 2012/0307712 A1* | 12/2012 | Watanabe | 370/315 |
| 2015/0117861 A1* | 4/2015 | Ponzini et al. | 398/79 |

FOREIGN PATENT DOCUMENTS

| | | |
|---|---|---|
| CN | 100589407 C | 2/2010 |
| WO | 2009068592 | 6/2009 |

* cited by examiner

*Primary Examiner* — John Blanton
(74) *Attorney, Agent, or Firm* — Charles Bergere

(57) ABSTRACT

Adding a new subsystem node to a multi-node base station topology (e.g., a chain or tree topology) in a telecommunications network can disrupt the effective operation of the existing multi-node base station. By accurately measuring the timing difference between uplink and downlink signaling across a current terminating node during the configuration of the new terminating node, the new node can be added with reduced impact upon the operation of the existing base station nodes.

6 Claims, 17 Drawing Sheets

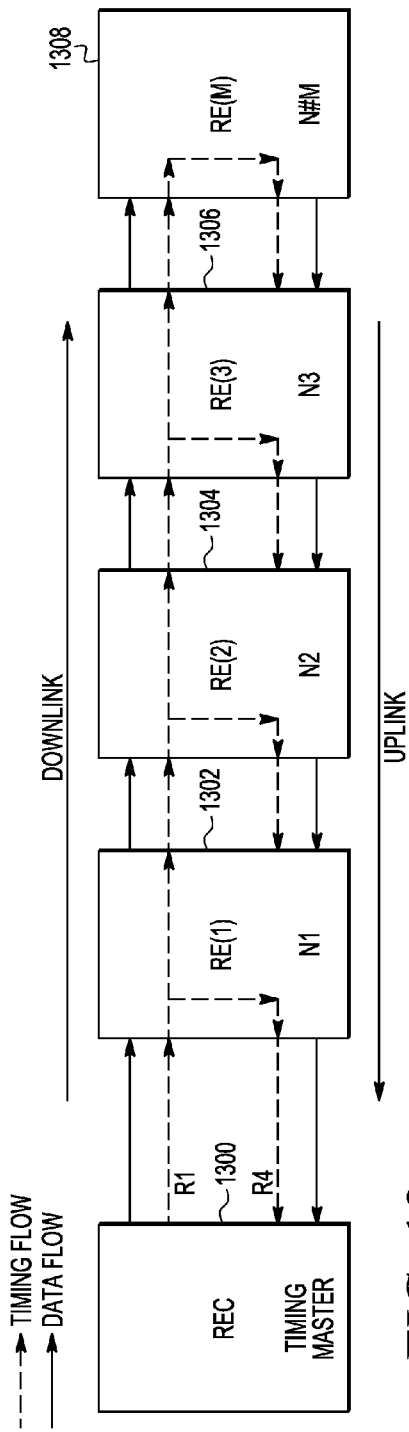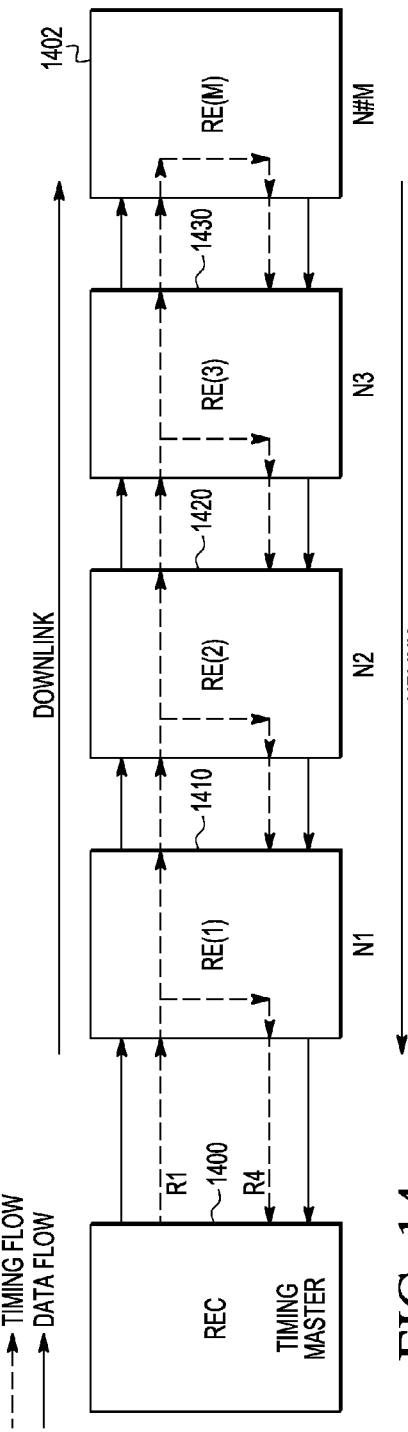
FIG. 13
FIG. 14

METHOD FOR ADDING LEAF NODE TO
MULTI-NODE BASE STATION

BACKGROUND OF THE INVENTION

The present invention relates generally to radio equipment for wireless telecommunications and, more particularly, to a method for adding a leaf node to a multi-node base station.

In the implementation of base stations within wireless telecommunications networks there has been a trend for the distribution of the base station functionality across more than one physical device. This trend is particularly marked in the network architectures of the 3GPP Standards (such as recent releases of UMTS (Universal Mobile Telecommunications System) and LTE (Long Term Evolution)) and in WiMAX (Worldwide interoperability for Microwave Access).

To facilitate communication of data between the distributed base station subsystems, an interface specification, Common Public Radio Interface, CPRI, has been established [CPRI version 5.0 published 21 Sep. 2011]. Using CPRI, it is possible to arrange the base station subsystems in a chain. Each distributed base station needs at least one controller subsystem (to establish network interfaces between the base station and the core network of a telecommunications network as well as to other base stations) and at least one radio access subsystem (for providing an air interface between the base station and communications terminals, such as mobile phones and computing devices with suitable wireless modem equipment). At least one bidirectional interface, referred to as a "CPRI link", connects the controller subsystem directly to the radio access subsystem. Further radio access subsystems can be attached to subsystems already linked using CPRI links, thereby creating a chain.

Maintaining CPRI links requires careful arrangement of the signaling between existing subsystems so that timing flows remain predictable. Adding a new subsystem node may disrupt this careful arrangement, leading to unexpected failures and, potentially, loss of part, or all, of the radio access network provided by distributed base station arrangements.

BRIEF DESCRIPTION OF THE DRAWINGS

The invention, together with objects and advantages thereof, may best be understood by reference to the following description of preferred embodiments together with the accompanying drawings in which:

FIG. 3A sets out certain steps in the operation of a point to point network, while

FIG. 7A shows the signaling paths for the respective data planes in the first part of Phase I of the four-phase algorithm describing the setup of the new node (RE2) and its configuration, whereas

FIG. 9A illustrates signalling paths, while

FIG. 10A illustrates signalling paths, while

FIG. 11A illustrates the signalling paths for Phase IV of the four-phase algorithm in which the REC configures offset for RE2 and starts user plane data, whereas

FIG. 13 illustrates an exemplary chain having one REC and three REs in a chain;

FIG. 14 shows an alternative exemplary chain having four RECs and one RE;

DETAILED DESCRIPTION OF PREFERRED EMBODIMENTS

Figure 1:
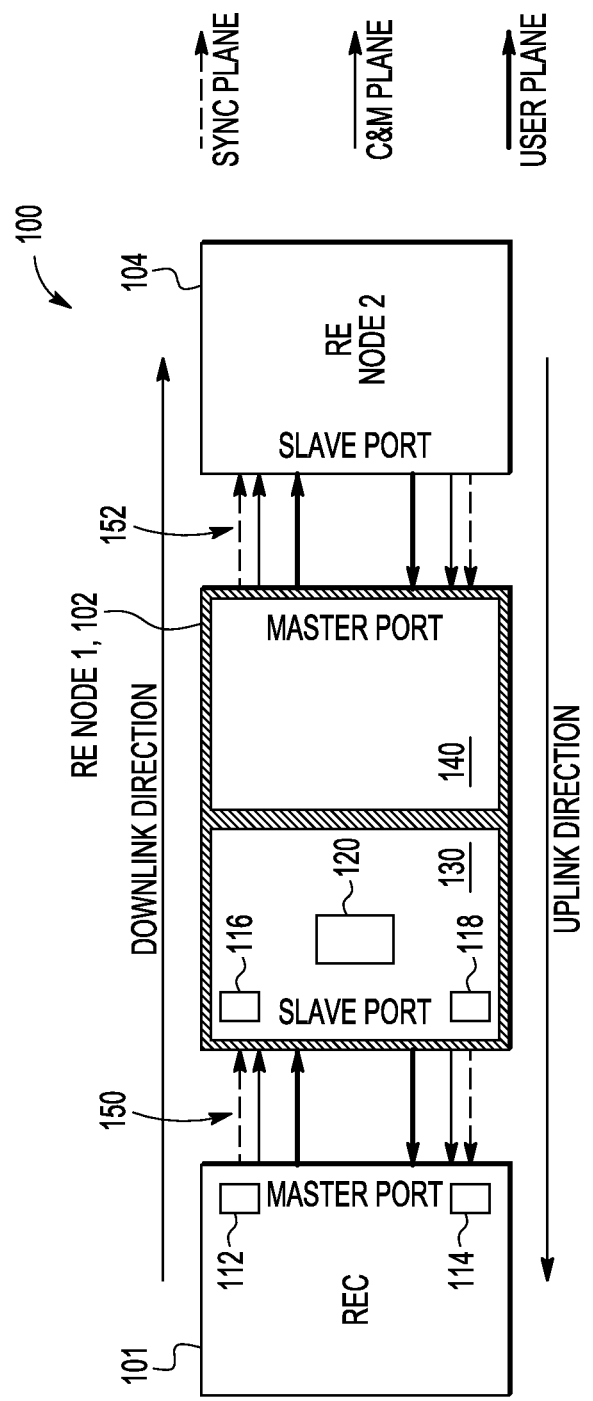
FIG. 1 shows a conventional CPRI chain having a controller subsystem and two radio equipment subsystems.

The detailed description set forth below in connection with the appended drawings is intended as a description of presently preferred embodiments of the invention, and is not intended to represent the only forms in which the present invention may be practised. It is to be understood that the same or equivalent functions may be accomplished by different embodiments that are intended to be encompassed within the spirit and scope of the invention. In the drawings, like numerals are used to indicate like elements throughout. Furthermore, terms "comprises," "comprising," or any other variation thereof, are intended to cover a non-exclusive inclusion, such that module, circuit, device components, structures and method steps that comprises a list of elements or steps does not include only those elements but may include other elements or steps not expressly listed or inherent to such module, circuit, device components or steps. An element or step proceeded by "comprises . . . " does not, without more constraints, preclude the existence of additional identical elements or steps that comprises the element or step.

In one embodiment, the present invention provides a method for dynamically adding a leaf node to a multi-node base station system having at least one control node and at least one active radio access node, the at least one active radio access node having a first lane for receiving data from the control node and transmitting further data to the control node. The method includes:

enabling a second lane in said at least one active radio access node, said second lane being coupled to a lane of the leaf node;

in the at least one active radio access node, measuring the frame timing difference between the receive timing in the uplink from the leaf node and receive timing in the downlink;

establishing synchronization between the control node and the leaf node using the measured frame timing difference; and setting user plane data parameters for said leaf node thereby initiating transmission of user data to said leaf node.

In another embodiment, the present invention provides a node in a multi-node base station system having at least one control node, where the node is in communication with the control node. The node includes:

a first lane comprising:

a receiver unit for receiving downlink data from the at least one control node in at least one first container;

at least one transmitter unit, including a transmission framer, for transmitting uplink data to the at least one control node;
a timer operable to route timings to the at least one transmitter unit;
a networking interface; and
a code word filter unit for forwarding data corresponding to a selected subset of code words;
a second lane, forming a master port in communication to a leaf node, comprising:
a second receiver unit for receiving uplink data from the leaf node;
a second transmitter unit, including a transmission framer, for transmitting downlink data to the leaf node;
a timer operable to route timings to the second transmitter unit;
a second networking interface; and
a second code word filter unit for forwarding data corresponding to a selected subset of code words;
and
a timing difference calculator for establishing the timing difference between receive and transmit paths in the respective lanes of the node.

In yet another embodiment, the present invention provides a method for adding a terminating node in a CPRI chain having at least one active radio equipment (RE) node, the RE node having at least a first lane and a second lane, the method comprising:
enabling the second lane in the active RE node;
instructing the terminating node to set up;
receiving a power up acknowledgement message from the RE node, establishing synchronization between the RE node and the terminating node;
calculating a timing difference between the receive timing in the uplink from the terminating node and receive timing in the downlink;
reporting the timing difference to a radio equipment controller (REC);
establishing synchronization between the REC node and the terminating node using the measured timing difference; and
setting user plane data parameters for the terminating node, thereby facilitating the reception of user plane data from the terminating node.

In yet another embodiment, the present invention provides a method of operation of a radio equipment controller (REC) in communication with a networking node having a first and a second data flow lane, the method comprising:
instructing the networking node to enable its first and second lanes;
sending configuration instructions to the networking node;
receiving acknowledgement information corresponding to the configuration instructions;
assigning a node identifier to a terminating node coupled to the networking node;
once the node assignment has been acknowledged by the terminating node, receiving timing difference information from the networking node; and
setting user plane data parameters for the terminating node using the timing difference information, thereby establishing the user plane.

Various further aspects and embodiments of the present invention are provided in the accompanying independent and dependent claims.

It will be appreciated that features and aspects of the present invention described above in relation to the first and other aspects of the invention are equally applicable to, and may be combined with, embodiments of the invention according to the different aspects of the invention as appropriate, and not just in the specific combinations described above. Furthermore features of the dependent claims may be combined with features of the independent claims in combinations other than those explicitly set out in the claims.

As a result of the above, the present invention allows for the scaling of active links in CPRI chains with little or no impact upon the pre-existing active network controlled by the controller subsystem. Furthermore, the present invention has minimal impact upon software and control bandwidth and substantially no impact on in-phase quadrature, IQ, data bandwidth (i.e., the bandwidth required for user plane data in the interfaces to mobile terminals and in backhaul respectively).

In order to provide a standardized environment in which equipment providers can provide radio equipment entities within a wireless communications network, a number of equipment manufacturers have co-operated to define the Common Public Radio Interface (CPRI) specification. Network architectures for digital cellular telecommunication systems typically include an entity known as the base station. As wireless telecommunications expanded and diversified, the term "base stations" has come to refer to a physical entity or arrangement of subsystem entities that provide base station functional components. Examples of base stations include the base transceiver station (BTS) of the GSM standard, the NodeB of UMTS and the eNodeB of more recently released communications standards (such as the High Speed downlink/uplink Packet Access, HSxPA, and LTE). Radio Access Technologies such as WiMAX and LTE typically distribute the functions of the base station across more than one physical subsystem component—often at a different geographical location.

A base station, NodeB, in the UMTS network architecture offers an air interface between a plurality of mobile communications devices (often referred to as "user equipment" or "UE") and the communications network; this interface is known as the Uu interface. The NodeB also offers a network interface for communications to and from other base stations and the core network, the so-called "backhaul". This interface is referred to as the Iub interface in the UMTS network architecture.

While historically the NodeB may have been implemented as a single integrated network entity, it has become more common for the Uu interface to be provided by a subsystem entity known as a remote radio head (RRH). RRHs incorporate base station Radio Frequency (RF) circuitry (which in turn are coupled to an antenna arrangement) and the associated analog-to-digital/digital-to-analog converters (ADC/DAC) and up/down converters. Typically the RRH is mounted in a box on an antenna tower where it is associated with an antenna arrangement.

The main control and baseband functionality for such distributed NodeBs is provided by a control subsystem entity known as a base band unit (BBU). The BBU is typically located at an accessible site which may be some distance from the associated remote radio head or heads. The BBU can thus be serviced and powered more efficiently, safely and conveniently. As the BBU can also feed more than one RRH, the cost and associated network planning of a base station are reduced. The control subsystem is responsible for the Iub interface.

In WIMAX, the radio equipment is referred to as the "air interface" and the terminals used by subscribers are referred to as subscriber station entities (such as subscriber station, SS, and mobile subscriber station, MSS). In the following description the terms "user equipment" and "UE" include equivalent terms such as MSS and SS, where the context does not dictate otherwise.

Subsystem entities such as RRHs and BBUs may be provided on the same site as, or remote from, other subsystems within the "base station" arrangement, giving network planners flexibility in terms of positioning and operating base stations.

In the generalized terms of the CPRI specification, remote radio heads (RRHs) are a special case of an entity known as a radio equipment (RE), while baseband units (BBUs) are a special case of radio equipment control (REC). Both REC and RE are specific examples of "nodes". CPRI is the interface by which the REs and REC exchange information. Typically, RE and REC nodes are communicatively coupled via an electrical cable or a fiber optic cable. The coupling cable may be anywhere between a few centimeters and a few kilometers in length. The CPRI specification allows base stations to be constructed from a BBU manufactured by a first equipment supplier and one or more RRHs from the same or indeed any other standard compliant manufacturer.

The CPRI specification is generalized because it is implemented in base station equipment compliant with a number of different Radio Access Technologies (RATs) including WCDMA (for example the UMTS standard commonly referred to as 3G), LTE and WIMAX.

CPRI is a serial communications interface and is typically implemented as a fiber optic cable connection between at least one radio equipment (RE) node and a radio equipment control (REC) node. CPRI provides for two streams, an uplink stream directed from RE node to REC node and a downlink stream directed from REC node to RE node. CPRI provides for a number of different standardized stream speeds, the typical stream speed being 2.46 Gb per second (line bit rate option 3 in the CPRI Specification v5.0).

Three different types of information flow (User Plane data, Control & Management plane data and Synchronization plane data) are multiplexed over the CPRI. The C&M plane data itself comprises three different types of data; vendor specific (VSS), slow C&M channel (based on High-Level Data Link Control, HDLC) and fast C&M channel (based on the Ethernet standard).

The amount of user plane data necessary for either reception or transmission of a single carrier at an independent antenna element is referred to as an antenna-carrier (AxC) in the CPRI specification. The user plane data (in the form of in-phase and quadrature modulation data—"IQ data") is transmitted in a portion of the CPRI package known as an AxC container (also referred to as a "container" in the literature). For example, in UMTS communications, the CPRI specification states that a given AxC container contains IQ samples for one antenna-carrier for the duration of one UMTS chip.

In a CPRI package of 512 bits, 480 bits are reserved for AxC IQ samples and the remaining 32 bits are reserved for "control words". The control words include the C&M plane data and the synchronization plane data flows. A package of 512 bits is also referred to as a (basic) frame and has a duration of one "chip". The chips are arranged in a "hyperframe" of 256 chips the data of each hyperframe is referred to as a "symbol". 150 symbols in sequence provide a "radio frame". In UMTS, a radio frame has a duration of 10 ms.

Each hyperframe within a radio frame has an associated frame number referred to as the hyperframe number (HFN). Likewise each basic frame within a given hyperframe has an associated frame number referred to as the basic frame number (BFN).

In its most simple form, the CPRI specification describes the protocol for a single direct link between an REC node and RE node (which may be referred to as point-to-point network). The REC node exposes a port to the RE node, the exposed port in the REC node is referred to as a "master port" as the timings of the signals sent in the synchronization, control and management and user planes are set relative to a clock associated with this node. In point-to-point networks, the RE node needs to align the timing of the signaling to the frame boundaries set by the master port. The timing offset between the two nodes is determined upon establishment of the CPRI link. The timing offset, measured in terms of hyperframe and basic frame values, is then applied to the sending and receiving of user plane data between the REC and the RE node.

CPRI connected devices can be configured in multiple network topologies. In particular, as set out in the CPRI specification, it is possible to arrange the radio equipment control and radio equipment nodes in chains. Other topologies are contemplated such as trees, stars and rings. In chain topology, two or more subsystem nodes are connected in sequence. The nodes need to be configured such that all the above mentioned data planes connect in a logical sequence along with a predictable timing flow across nodes.

The number of nodes required to be connected in any given CPRI chain is a function of the user base (i.e., the typical number of active user terminals served and/or the capacity required by those user terminals), investment and user density amongst other factors. Thus, the CPRI chain deployed needs be scalable to allow future requirements to be supported. It is thus desirable to provide a facility for dynamically adding a new RE node to an RE node currently terminating an active chain without interfering with any of the data planes and/or the timing of the in-service nodes. Furthermore it is desirable to allow for the initiation of both downlink and uplink communication for all three data planes in coherence to the logical network topology already established.

FIG. 1 illustrates certain features of a conventional CPRI chain 100 having a pre-existing CPRI link 150 between a radio equipment controller (REC) 101 and a first (networking) radio equipment node (RE node 1) 102 and a further CPRI link 152 to a second (terminating) radio equipment node (RE node 2) 104.

Figure 2:
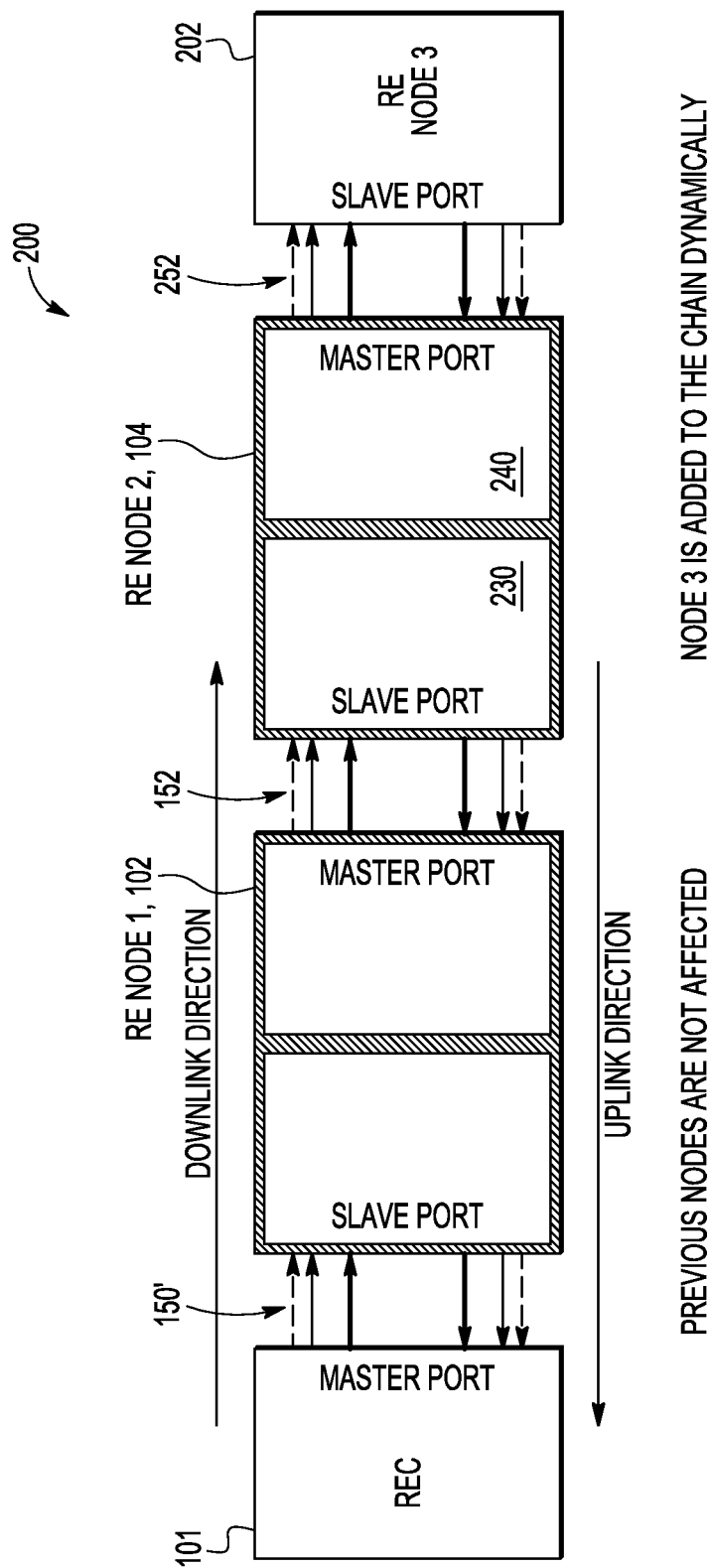
FIG. 2 illustrates the addition of a further radio equipment subsystem (Node 3) to the CPRI chain of FIG. 1.

FIG. 2 illustrates the addition of a further radio equipment subsystem (RE node 3) 202 to the CPRI chain of FIG. 1 by another CPRI link 252, showing a CPRI chain 200 having increased chain length after such scaling. Linking a further RE node (i.e., RE node 3) 202 to a pre-existing linked node (or series of linked nodes) requires the accurate determination of respective timing offsets between each of the pre-existing nodes and the node to be added. There is therefore a need to provide all the necessary information to establish a new link in a chain without disrupting the smooth operation of the pre-existing links.

As can be seen in both FIGS. 1 and 2, the CPRI specification allows for each RE node to be logically separated into at least two "lanes" 130, 140. In a typical terminating node, only one of these lanes is activated. However, to accommodate the pass-through of signals within the chain, tree or ring topologies, any non-terminating RE node has both lanes active. Each lane in turn operates as a master port or a slave port respectively so that a chain of RE nodes depending from an REC, whose port (or ports) are master ports by default, have a slave port in communication to the master port of the REC in a first lane (lane 1) and an active master port in a second lane (lane 2) in communication with a further RE node in the chain. Only the terminating node (sometimes referred to as a "leaf node") retains an inactive lane (lane 2) and an active lane (lane 1—operating as a slave port). This inactive lane is not shown in the respective (new) leaf nodes of FIGS. 1 and 2.

The packets of data transmitted in accordance with the CPRI specification are prepared for communication in the downlink direction by an REC framer module 112. A corresponding RE node deframer 116 is provided in the slave port of the first lane 130 of the RE node 102. Likewise CPRI packets in the uplink are prepared in an RE node local framer 118 in the slave port of the first lane 130 for transmission to a REC master port deframer 114. To ensure synchronization the first lane 130 is provided with a timer module 120. The timer module 120 determines the received (Rx) timing from CPRI packets containing synchronization data and routes this received timing to the slave port transmitter for synchronizing the slave port local framer 118, thereby ensuring that C&M and user plane data, in the uplink, is correctly synchronized with the REC 101. Once synchronization is established the REC 101 assigns one or more antenna system (AxC) containers to uplink IQ data from the RE node 102. The RE node's Rx and Tx timings are used by the REC 100 to determine a receive offset value in terms of the hyperframe number (HFN) and basic frame number (BFN) and this offset value is used to deframe the uplink data from the RE node. Thereafter, the assigned container or containers are enabled in the uplink.

Figure 3A:
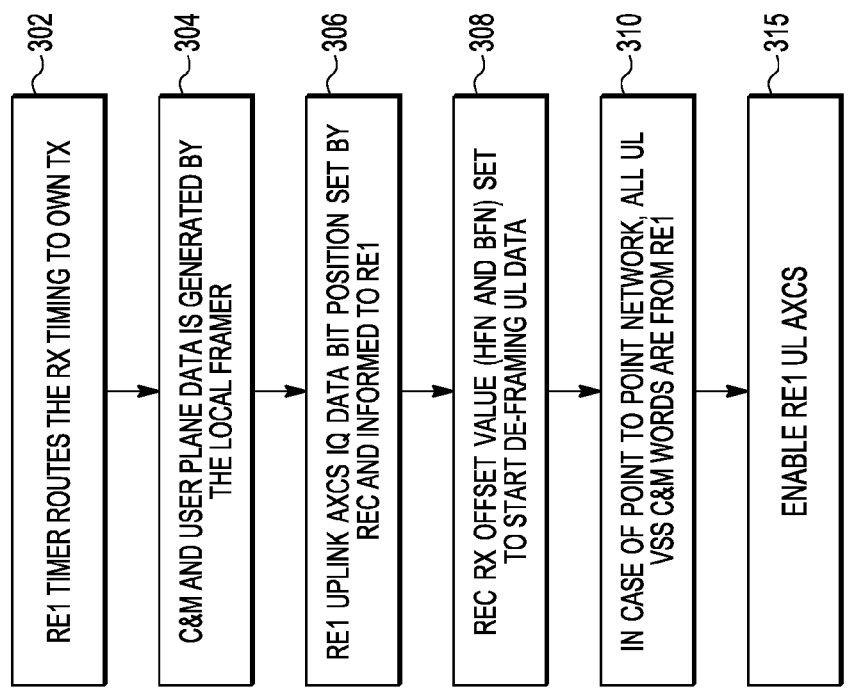

FIG. 3A sets out certain steps in the operation of a point to point network. In step 302, a radio equipment node timer, RE1 timer, routes the Rx timing to the RE node's own Tx. In step 304, control and management (C&M) plane and user plane data is generated by the local framer in RE1. In step 306, the RE1 Uplink AxCs IQ data bit position (i.e. the position within the basic frame at which the, or each, container to which the RE1 uplink user plane data is assigned appears) is set by an REC node and informed to the RE1 node. In step 308, the REC Rx Offset value (measured in HFN and BFN) is set to start de-framing of uplink data. In a point to point network such as that illustrated in FIG. 3B, all uplink VSS C&M words are from RE1, step 310. In step 315, the RE1 UL AxC containers are then enabled.

Figure 3B:
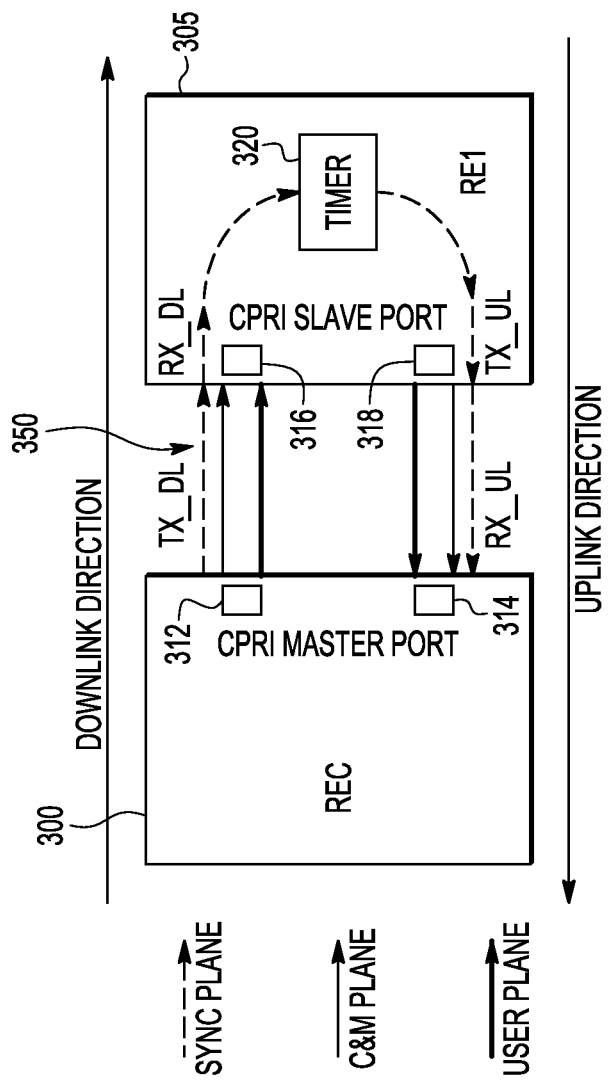
FIG. 3B illustrates functional blocks within a conventional point to point network.

FIG. 3B illustrates functional blocks within a conventional point to point network. An REC node 300 is in communication with a radio equipment node, RE1 305. As for FIGS. 1 and 2, the REC node 300 has a REC framer module 312 at the REC node (downlink) transmitter Tx_dl and a REC master port deframer 314 at the REC node (uplink) receiver Rx_ul. The RE1 node 305 provides a CPRI slave port (e.g., in lane 1) and includes an RE node deframer 316 at the RE1 node (downlink) receiver Rx_dl, a timer 320 for relaying the receiver timing for downlink signals to the RE1 node's (uplink) transmitter Tx_ul, and an RE node local framer 318 at the uplink transmitter Tx_ul.

Figure 4:
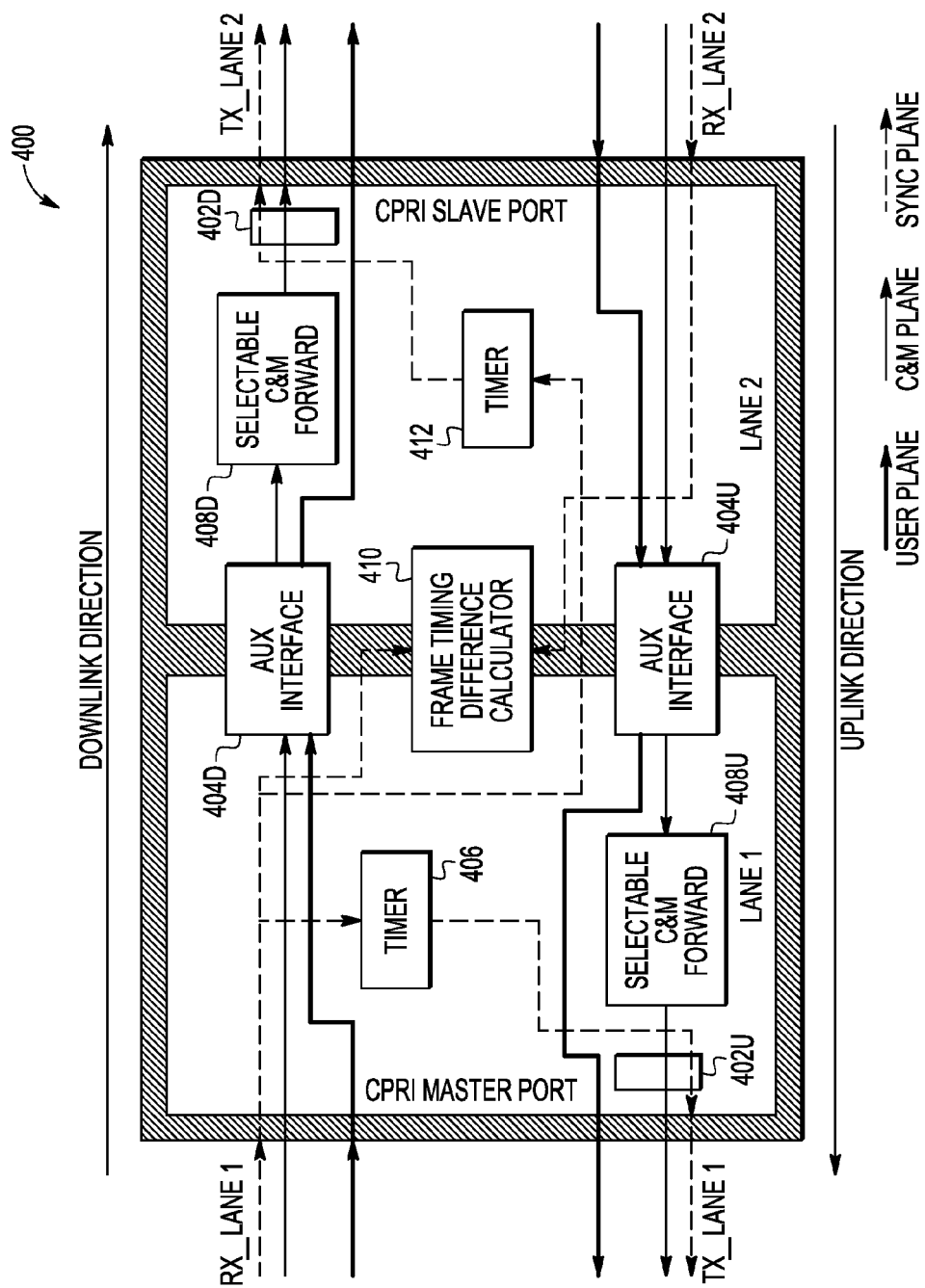
FIG. 4 illustrates a radio equipment subsystem node as prescribed in embodiments of the present invention.

FIG. 4 illustrates hardware components within a node in accordance with certain embodiments of the present invention and indicates how these hardware components enable the dynamic addition of a downlink RE node. FIG. 4 shows a radio equipment subsystem (i.e. an RE node) 400 in accordance with certain embodiments of the present invention. The illustrated RE node 400 is a networking node having two active lanes: a first lane (Lane 1) providing a slave port and second lane (Lane 2) providing a master port.

The RE node 400 comprises certain functional elements including uplink and downlink transmit framers 402d, 402u and uplink and downlink auxiliary interfaces 404d, 404u (to transfer received data to the respective transmit framers in the paired lane). The auxiliary interfaces 404d, 404u are also referred to as networking interfaces. The RE node 400 further comprises a first lane timer 406 capable of routing received timing to a first lane transmitter unit. Uplink and downlink control word filters 408d, 408u are also provided in the RE node 400 (i.e. a means for selectable control word forwarding, these "filters" supply logic for applying necessary pipeline delay management and mask bits to determine whether to forward the individual bits within a basic frame or to insert locally). The RE node 400 further comprises a second lane timer 412 capable of routing received timing to a paired transmitter unit, Tx, (i.e., the transmitter handling the transmission towards a newly attached RE node in the paired, second lane of the RE node 400).

The RE node 400 further comprises a frame timing difference calculator 410, which is a hardware component operable to calculate frame timing difference accurately. A suitable implementation of this logic is discussed below in more detail in relation to FIG. 17.

In operation, the RE node 400 executes a four-phase algorithm to add a new terminating node to an established CPRI hop or multi-hop connection. Note that the same algorithm operates whether the already established network is a two node point-to-point link or a pre-existing multi-node chain. The proposed flow of the node addition algorithm enables the new node to synchronize itself to the network topology timing followed by receiving/sending to/from all the three data planes seamlessly.

Compared to the operation of a conventional RE node, a different routing of the respective data flows is required. The illustrated hardware components inside the networking node are used to ensure seamless addition of a new terminating RE node.

Each lane within a given node (RE or REC) has a corresponding, respective timer which can select frame boundaries (i.e., set the timing of its output signal) from the sync plane received on a Rx stream from its own lane's receiver or from the Rx stream of the paired lane. The selected frame boundaries in turn are used to realign that lane's Tx stream.

The respective networking interfaces are present between lanes of the RE node. These interfaces operate to supply user and C&M plane data from the Rx of one lane to the Tx of another paired lane in the node. Each lane is provided with a control word filter. This filter is a hardware component that operates to perform selectable masking of C&M words, thereby ensuring specific, predetermined, C&M words are forwarded within any given hyperframe, for example certain subchannels within the VSS data blocks.

The radio equipment subsystem is further provided with a frame timing difference calculation logic that computes the timing difference between DL timing received on Lane 1 Rx and UL timing received on Lane 2 Rx.

Figure 5:
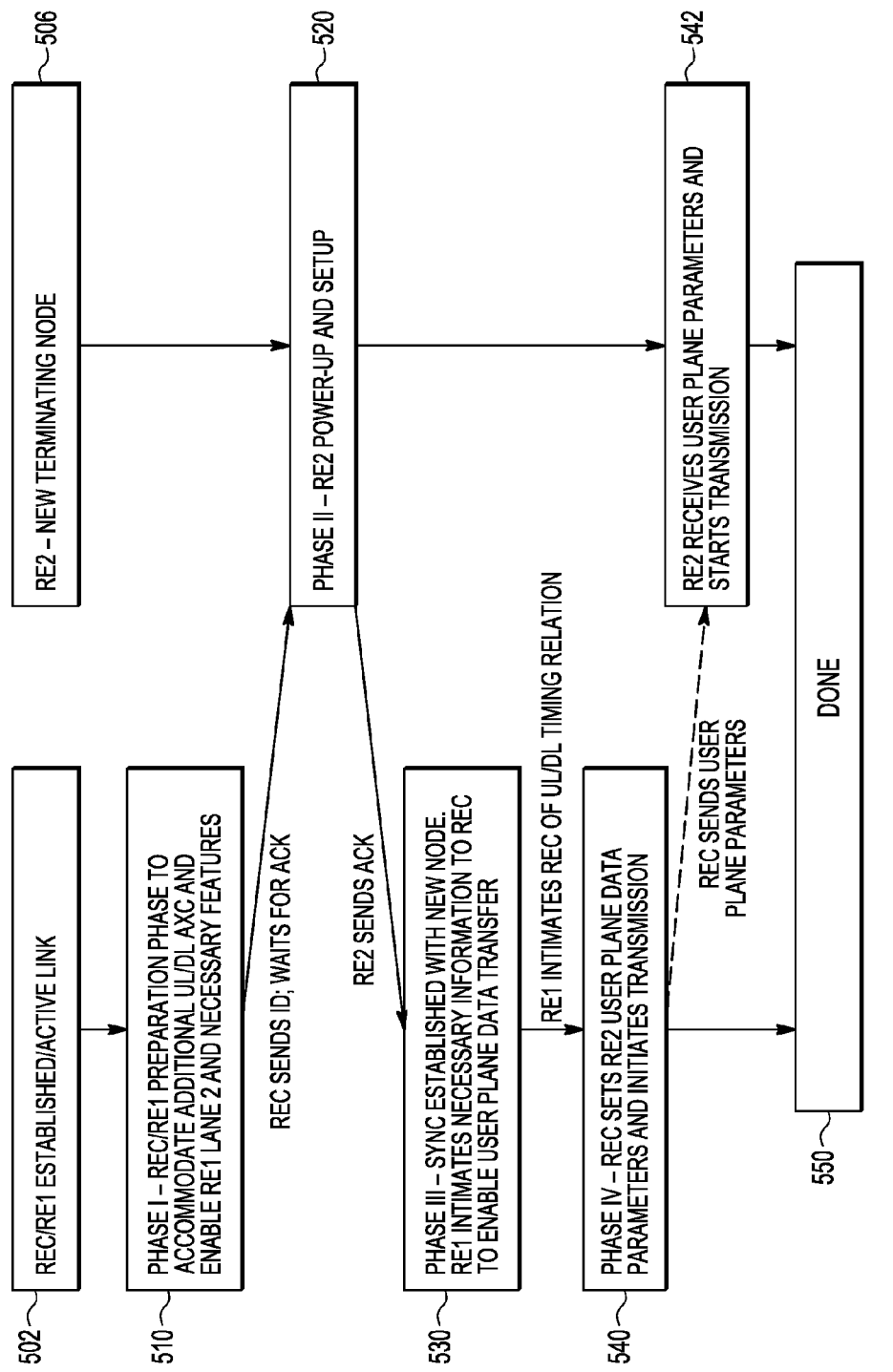
FIG. 5 illustrates diagrammatically certain steps of a method for adding a new terminating node in accordance with embodiments of the present invention.

FIG. 5 illustrates diagrammatically certain steps in a suitable algorithm for adding a new terminating RE node 506 in accordance with certain embodiments of the present invention. In this context, the algorithm may be considered to have four distinct phases:

Phase I 510—in which an REC (RE) node 502 initiates addition of new node 506 at end of a chain Phase II 520—in which the new node 506 is brought up to the preexisting multi-node chain 502 and link setup routine executes on the new node 506

Phase III 530—in which the receivers (in lanes 1 and 2 respectively), sync on the (currently) terminating node RE1 to be joined to the new node; and Phase IV 540—in which offset calculations are made and user plane (IQ data) is enabled between the former terminating node RE1 and the newly attached node.

In Phase I 510, an REC node initiates addition of new node (RE2) at end of a chain of nodes. The REC node selects containers (AxCs) for UL/DL user plane (IQ data) to assign to the new RE node, RE2. The IQ data bit position is decided for RE2. This is important as the containers themselves may appear at different bit positions within the IQ blocks of each basic frame depending upon the precise implementation of the CPRI specification. Thus section 4.2.7.2.3 of the CPRI specification illustrates AxC bit positions in "packed position" and "flexible position" respectively. The REC inserts known patterns (corresponding to the information type) in VSS data to mark information type. The REC then enables an auxiliary path for both lanes in RE1 through either:

VSS path: where a pattern is selected to mark configuration request in VSS data. An auxiliary path enable request is sent on the DL path; or Eth path: where an ethernet packet is sent to RE1 with configuration marker to enable an auxiliary path.

The REC next sets the timer of Tx in Lane 2 of RE1 (i.e., the transmitter that will transmit data to RE2) to sync to timing received on the paired lane (i.e., the timing obtained from the receiver on lane 1). The REC selects a suitable VSS subchannel for RE2. While the mechanism for making a suitable selection is in no way limited to the following, two alternative methods for doing this are described by way of illustration.

In a first method, the REC sends a respective node ID to each node on startup on a fixed subchannel using a known marker. As is explained at section 4.2.7.4 of the CPRI specification (v. 5.0), the 256 control words of a hyperframe are organized into 64 subchannels of 4 control words each. One subchannel thus contains 4 control words per hyperframe. The VSS block within the C&M code words corresponds to subchannels 16 to P, where P is a pointer that can be set anywhere between 19 and 63 depending upon the need for fast C&M data. The VSS subchannel assigned to each node is equal to its node ID+16 (in the case of UL) and node ID+17 in the case of DL. Thus the first node next to REC gets node ID=0 and inserts VSS data from control words in subchannel 16 and receives on subchannel 17. Note that DL path subchannel 16 is read by all nodes and is used similar to broadcast from REC.

Alternatively, in a second method, the REC may assign the 16th subchannel to the new node and the current last node may be assigned a fixed subchannel. Thus in a chain of nodes linking REC>RE1>RE2>New node, RE1 starts with the 17th subchannel assigned and RE2 with the 16th. During addition of a new node, RE2 is assigned subchannel 18 and the new node is assigned subchannel 16.

Depending on which of the illustrated VSS subchannel assignment methods is adopted, the RE1 is then configured to insert local VSS data on the subchannel assigned to it and to forward all other VSS data on the UL path.

The REC configures RE1 Lane 1 Tx to insert only local IQ data bits (i.e., IQ data in AxC containers currently associated with the RE1 node) and to forward all other. For all RE1 configuration requests, the REC may optionally wait for an acknowledgement. RE1's Lane 2 Tx then forwards all data received on the DL path. The REC sends node ID to RE2 after one radio frame. The REC instructs RE1 to wait for rx sync on lane 2 and then to initiate frame timing calculation after 10 ms (i.e., the duration of a radio frame). The REC waits on UL VSS subchannel assigned to RE2 for confirmation of receipt of the node ID.

In Phase II 520, the new node (RE2) is powered up. RE2's Tx timer is configured to sync to timing received on its own Rx (RE2 only has one lane active as it is now operating as a terminating node). Once Rx sync is received at RE2 through the DL path, Node ID is ascertained by RE2. By default it may use node ID=0.

Once node ID information is received, the correct VSS subchannel is used by RE2 to send acknowledgment to the REC node. Which subchannel is used depends on the choice of method being used. In the illustrative methods, either the last (terminating) node always uses 16$^{th}$ VSS subchannel in both UL/DL or it uses node ID to select the correct VSS subchannel. An acknowledgement is sent using a known marker in VSS data.

In Phase III 530, the respective Rx components on RE1 are synched. RE1 detects sync on both lanes and then RE1 initiates a hardware assisted timing difference calculation between timing received on Lane 1 Rx and on Lane 2 Rx. The difference calculated is signaled to the REC using its own UL VSS subchannel enclosed within known markers.

Finally in Phase IV 540, the REC receives the timing calculation performed by RE1. REC calculates the Tx offset value for RE2 as follows:

RE2 *Tx* offset=REC *Rx* offset−Cumulative Difference calculated (i.e., including RE node 1)

This Tx offset is signaled to RE2 through VSS code words on the RE2 VSS subchannel. The Rx offset for RE2 is same as REC Tx offset and is likewise programmed through VSS signaling. The REC then enables RE2 Rx containers for IQ data. Similarly, the REC enables Tx IQ data once Rx offset for RE2 has been programmed.

As a result, RE2 will now receive IQ data on the DL path at its Rx offset value. Next, the REC enables new containers (AxCs) on its own Rx corresponding to the containers expected from RE2. Valid Rx data for the new AxCs would be available from Rx offset programmed in the REC. The REC then enables RE2 Tx containers once the Tx offset is programmed. Finally, RE2 starts transmitting UL IQ data at Tx offset programmed (step 542).

A new node has to be added that would support two AxCs in UL and DL. The following protocol is used to mark information on VSS:

[7 bit pattern] [1 bit lane] [32 bit reg address] [32 bit value].

Suitable values for the [7 bit pattern] in this example might be:

1111_110: Configuration
1111_111: Acknowledgement after configuration
1111_100: Send Node ID
1111_101: Acknowledgement after node ID receipt
1111_000: Timing difference value
1111_001: Timing difference ACK The [1 bit lane] may be conveniently set to 0 to select lane 1 and set to 1 to select lane 2 within a given node.

VSS subchannel selection is done using node ID in this example, as explained above. Using this protocol, the basic configuration steps would be implemented as follows:

REC sends [1111_110] [x] [reg] [val] on DL path VSS subchannel; and
RE sends [1111_111] [x] [reg] [val] on UL path VSS subchannel.

Likewise the steps for notifying a given node ID would be as follows:

REC sends [1111_100] [ ] [ ] [nodeid]; and
RE sends [1111_101] [ ] [ ] [nodeid].

Thus any RE which has sent a nodeID ACK does not monitor DL subchannel 16 for setting nodeID. In normal operation, there will only ever be one node (the newly added one) monitoring for DL signals on the VSS subchannel 16. If REC decides to revise nodeID, it would send the request on the DL VSS subchannel for the previous nodeID+17.

Figure 6:
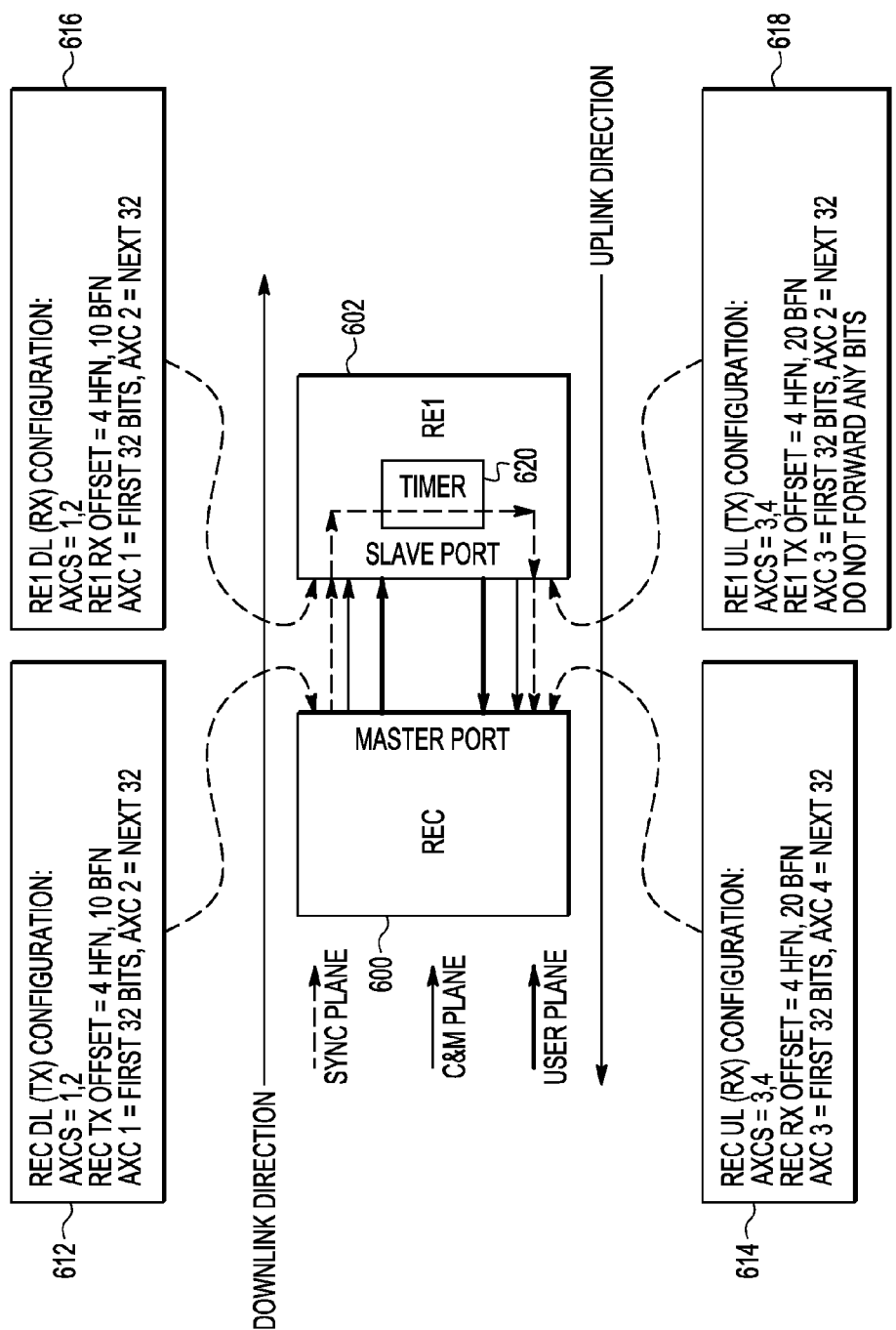
FIG. 6 shows a use case illustrating the detailed operation of an active point to point link.

Consider an example of the operation of an active point to point link running at 9.8 GHz as illustrated in FIG. 6. This system has two active AxCs each in UL (AxCs 3 and 4) and DL (AxCs 1 and 2) respectively. The DL transmitter (in REC node 600) is configured to support AxCs 1 and 2 with an REC Tx offset of 4HFN, 10 BFN, 612. The DL receiver (in RE1 node 602) is configured to support AxCs 1 and 2 with an RE1 Rx offset of 4HFN, 10 BFN (i.e., the same as the REC Tx offset), 616. The UL transmitter (in RE1 node 602) is configured to support AxCs 3 and 4 with an RE1 Tx offset of 4HFN, 20 BFN, 618. The UL receiver (in REC node 600) is configured to support AxCs 3 and 4 with an REC Rx offset of 4HFN, 20 BFN (i.e., the same as the RE1 Tx offset), 614.

Figure 7A:
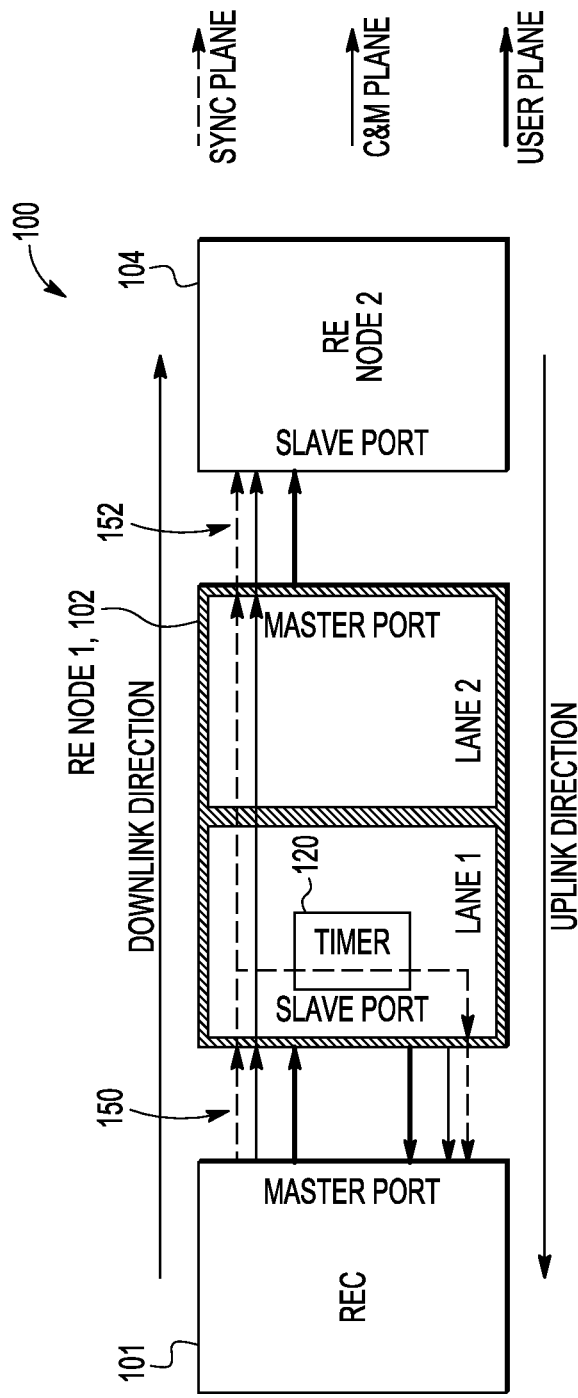
Figure 7B:
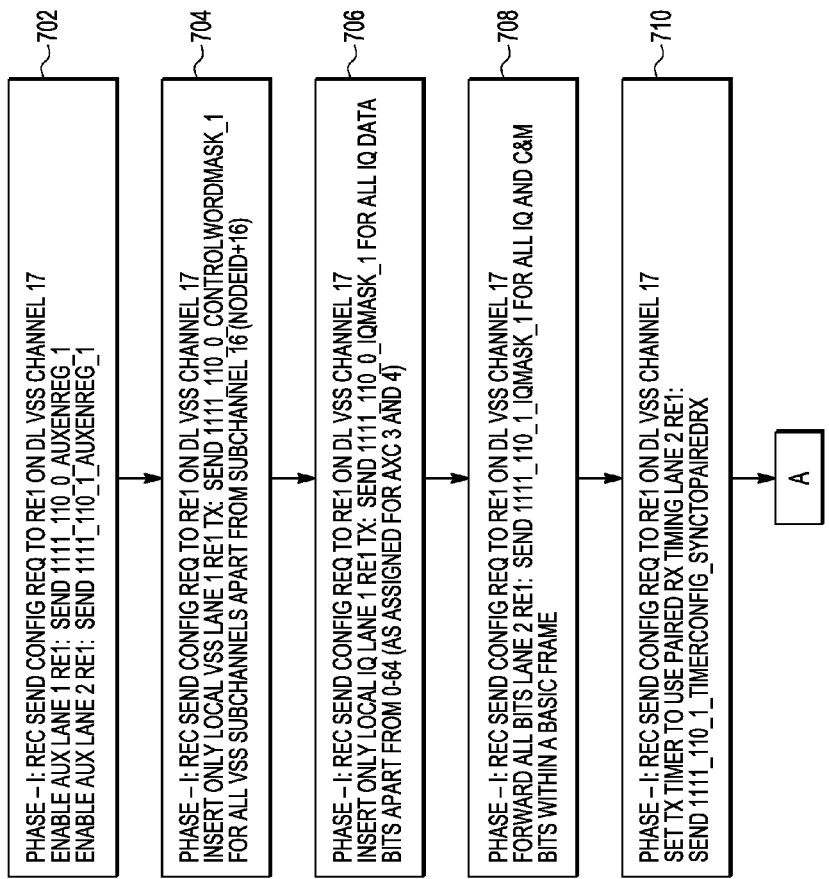
FIG. 7B illustrates corresponding steps.

Just as the typical point-to-point network in FIG. 3B, the REC 600 in FIG. 6 acts as the timing master and all nodes 602 need to align their timing to the frame boundary generated by it. Apart from timing, REC sends/receives user plane data at known hyperframe-basicframe values (HFN,BFN) programmed as offset (tx/rx). Continuing from the use case in FIG. 6, and using the reference numbers from FIG. 1, FIG. 7A shows the signaling paths for the respective data planes in the first part of Phase I, in which the REC 101 sets up node RE1 102 as a networking (i.e. non-terminating node) and confirms configuration of node RE1 102. FIG. 7B illustrates corresponding steps.

In step 702, the REC instructs the RE node 1 (RE1) to enable auxiliary paths in both lane 1 and lane 2 using the protocol described above. The REC then instructs RE1 to apply a control word mask for the local lane 1 (step 704). This filters out signalling on all VSS subchannels apart from the "broadcast"-like subchannel 16.

Likewise the REC then instructs RE1 to apply an IQ data mask for the local lane 1 (step 706). This filters out signalling on all containers apart from the containers assigned to RE1—i.e., AxCs 3 and 4 in the first 64 bits of the IQ data block. The REC then instructs lane 2 of RE1 to forward all bits in IQ and C&M data blocks within each basic frame (step 708). The paired Tx timer on lane 2 of RE1 is then set to synchronise with the receiver timing from lane 1 (step 710).

Figure 8:
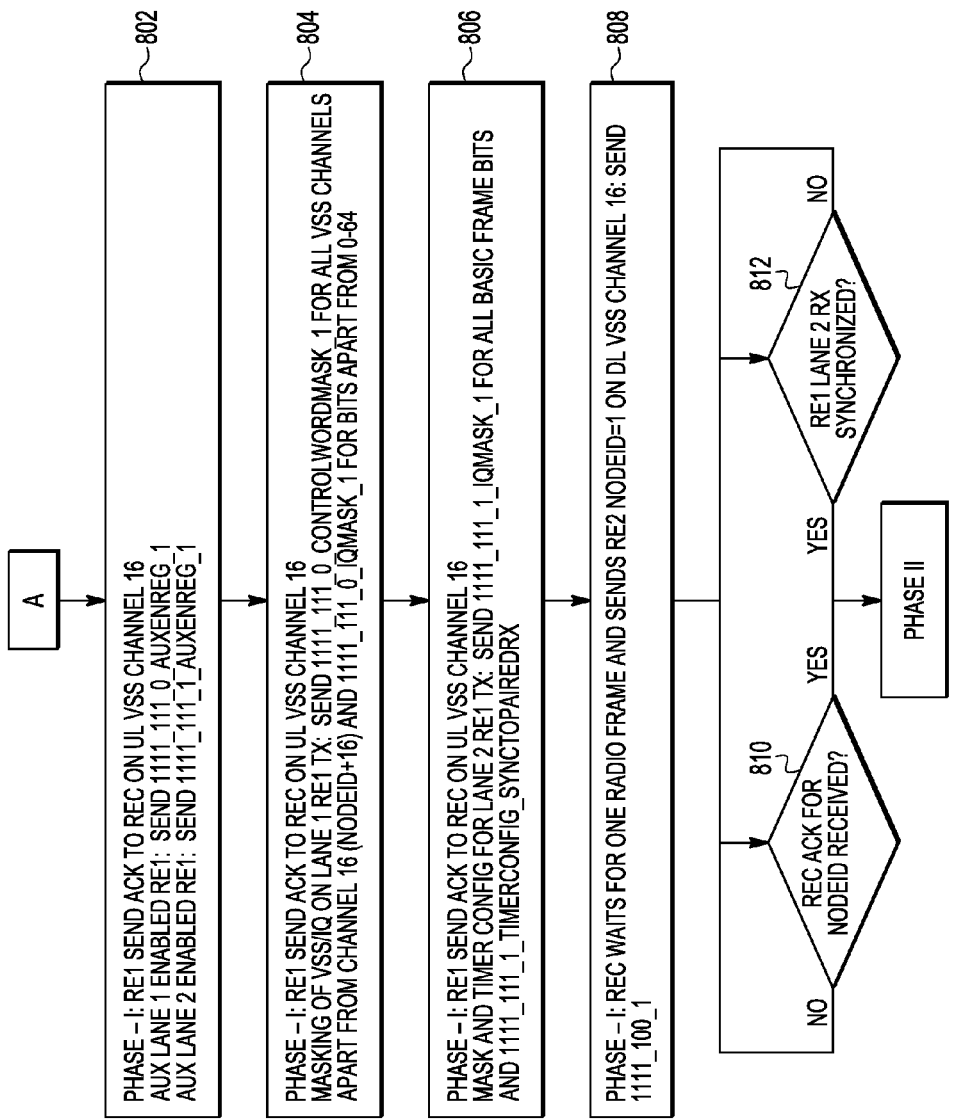
FIG. 8 shows further steps in the second part of Phase I.

FIG. 8 shows the second part of Phase I and continues from the connecting symbol "A". RE1 acknowledges each of the previous configuration instructions. At step 802, enablement of each auxiliary lane is confirmed. At step 804, lane 1 masking of VSS subchannels and IQ data containers is acknowledged. At step 806, the forwarding of all IQ and C&M data blocks is confirmed and the synchronisation of the paired Tx timer is acknowledged.

At step 808, the REC waits for a period corresponding to a radio frame before sending a node ID on VSS subchannel 16. If confirmation that the node ID has been received (implying that the RE node 1 will now monitor a different VSS subchannel for its instructions in future)—step 810—and provided the lane 2 Rx is correctly synchronised—step 812, the method proceeds to the next phase—Phase II.

Figure 9A:
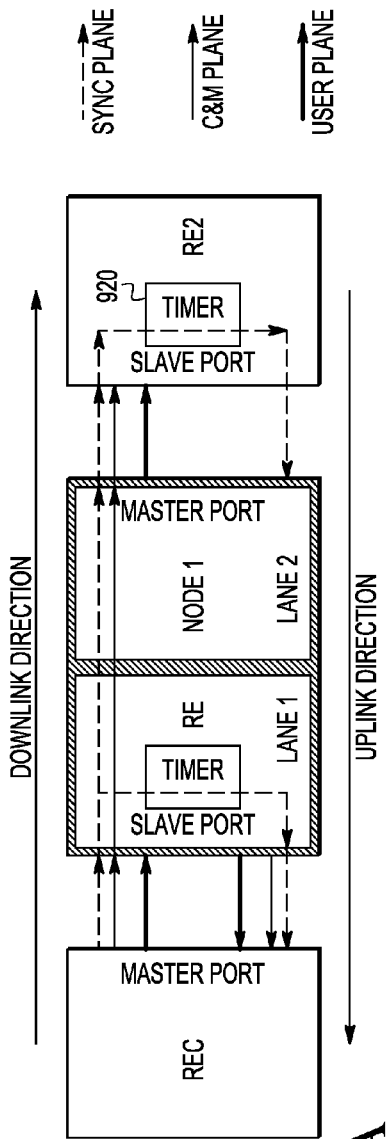
Figure 9B:
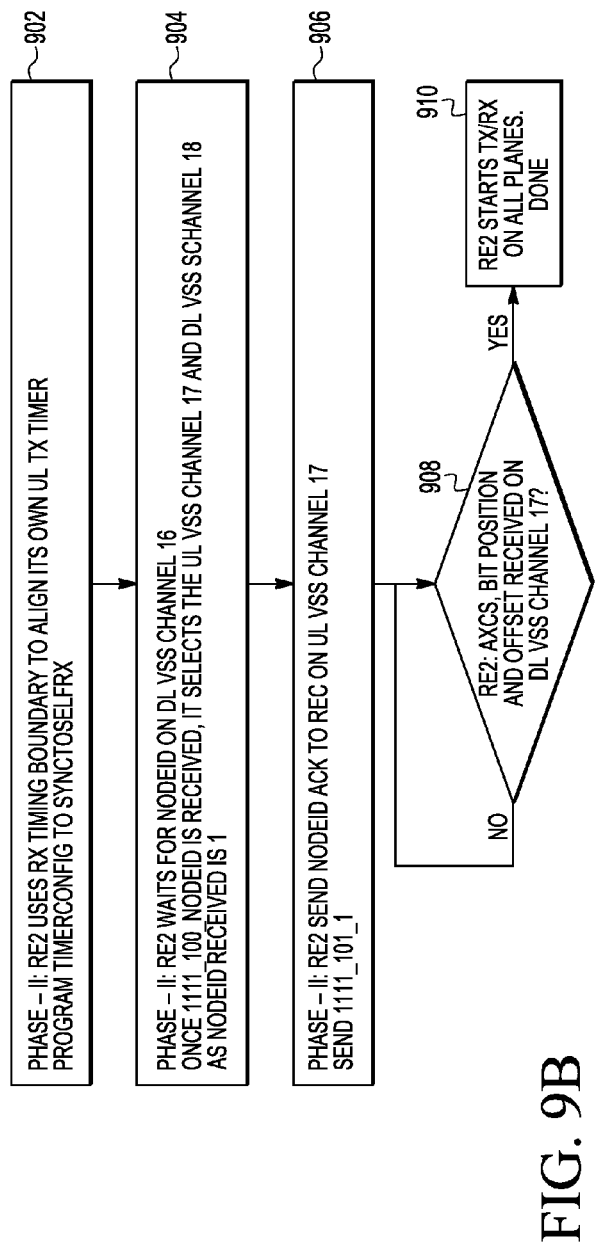
FIG. 9B shows certain steps in the implementation of Phase II.

FIG. 9A illustrates signalling paths while FIG. 9B shows certain steps in the implementation of Phase II of the algorithm describing the setup of the new node (RE2) and its configuration.

RE node 2 (RE2) starts up and, at step 902, timings received at the RE2 Rx are used to synchronise the RE2 timer 920. At step 904, RE2 waits for signalling of the node ID (by the REC) on VSS subchannel 16 and selects new VSS subchannels for UL (subchannel 17) and for DL (subchannel 18)—where NodeID received is 1. RE2 then sends an acknowledgement message to the REC for the node ID update, step 906. Provided AxCs, bit position and offset are all received on DL VSS subchannel 17 (step 908), RE2 starts transmission and receipt of data on all planes (step 910).

Figure 10A:
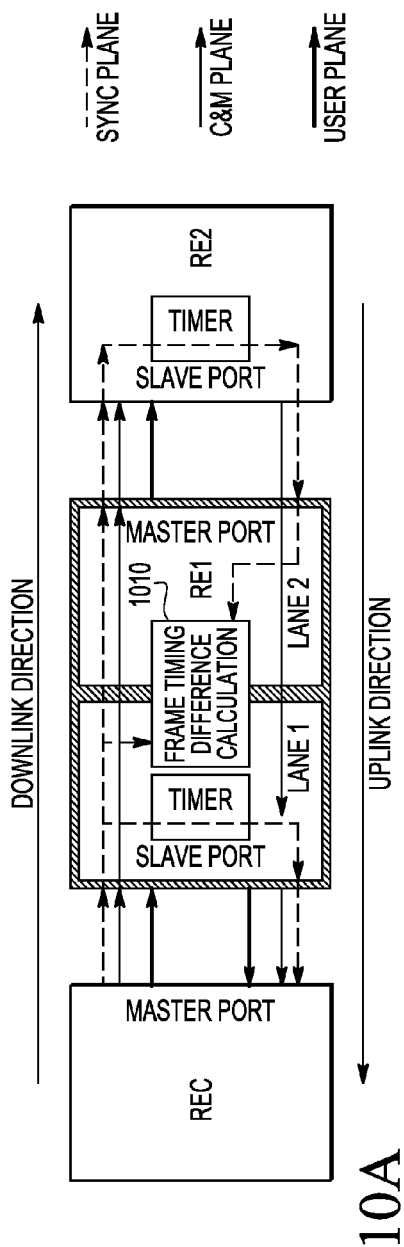
Figure 10B:
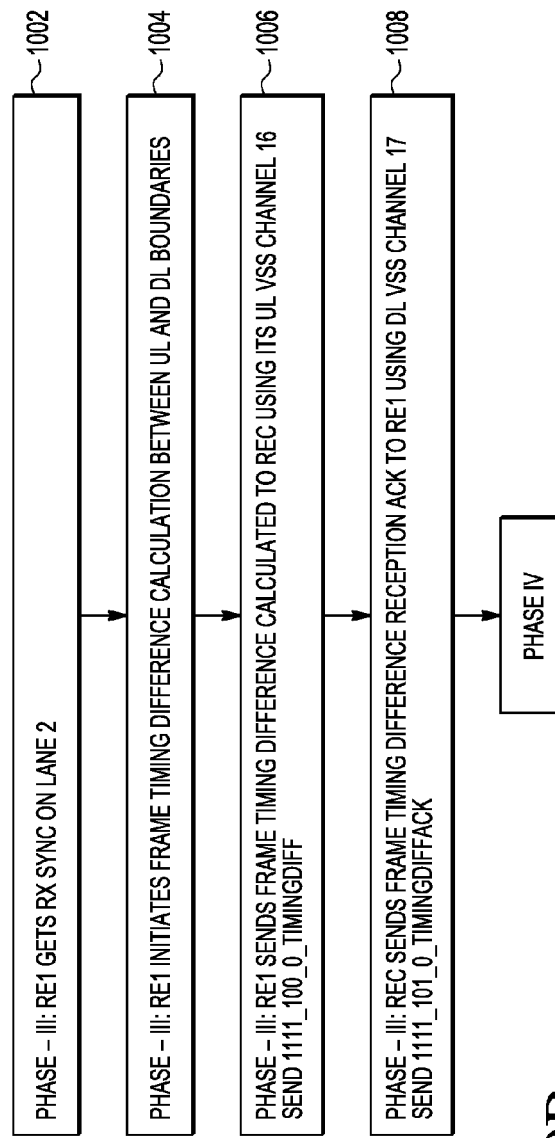
FIG. 10B shows certain steps in the implementation of Phase III, describing the timing difference calculation performed in the RE1 node.

FIG. 10A illustrates signalling paths, while FIG. 10B shows certain steps, in the implementation of Phase III of the algorithm describing the timing difference calculation performed in the RE1 node.

At step 1002, RE1 receives Rx sync data from its lane 2 receiver. Using this sync data and Rx sync data from the lane 1 receiver, the timings in the uplink and downlink are compared and a frame timing difference calculation is performed at a calculating unit 1010, step 1004. The resulting frame timing difference is signalled to the REC—step 1006—and the REC confirms receipt of this timing difference to RE1 on its dedicated DL VSS subchannel—step 1008.

Figure 11A:
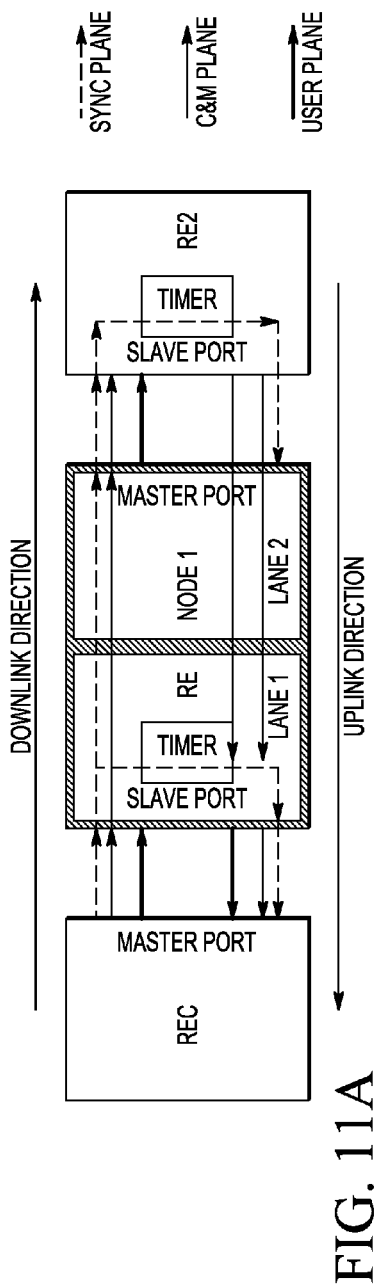
Figure 11B:
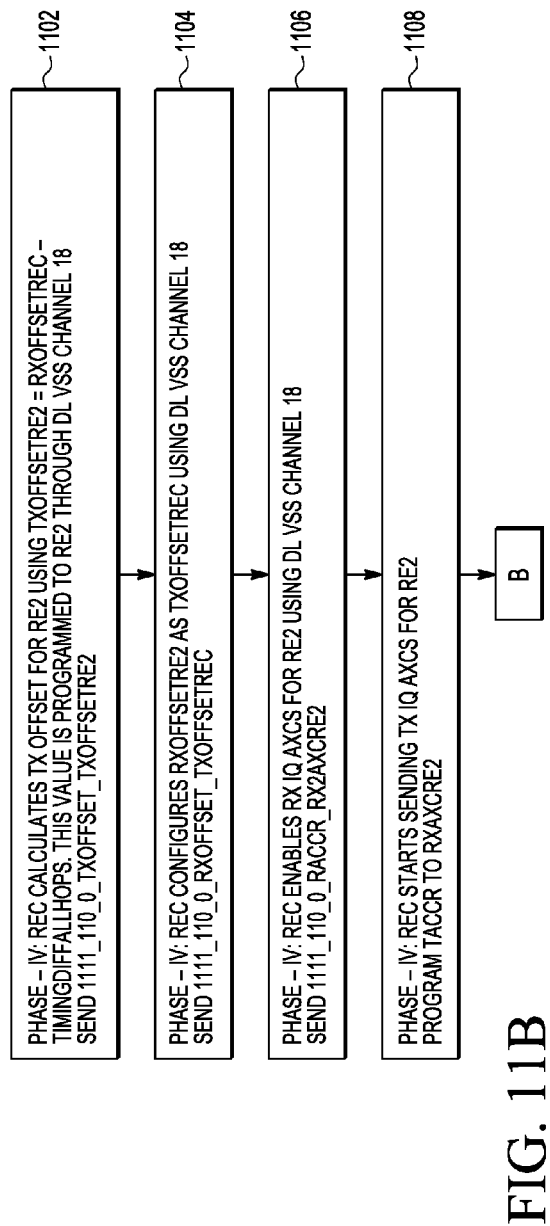
FIG. 11B shows certain steps in a first part of Phase IV.

FIG. 11A illustrates the signalling paths for Phase IV of the algorithm in which the REC configures offset for RE2 and starts user plane data. FIG. 11B shows certain steps in a first part of Phase IV.

At step 1102, the REC calculates Tx offset for RE2 using the received frame timing difference, TimingDiffAllHops, and signals this value to RE2 through RE2's assigned DL VSS subchannel 18. The REC then instructs RE2 to adopt the REC's Tx offset as the RE2 Rx offset timing, step 1104. New containers are assigned to IQ data for RE2 in the downlink, step 1106. The REC then starts to send IQ data in these newly assigned containers, step 1108.

Figure 12:
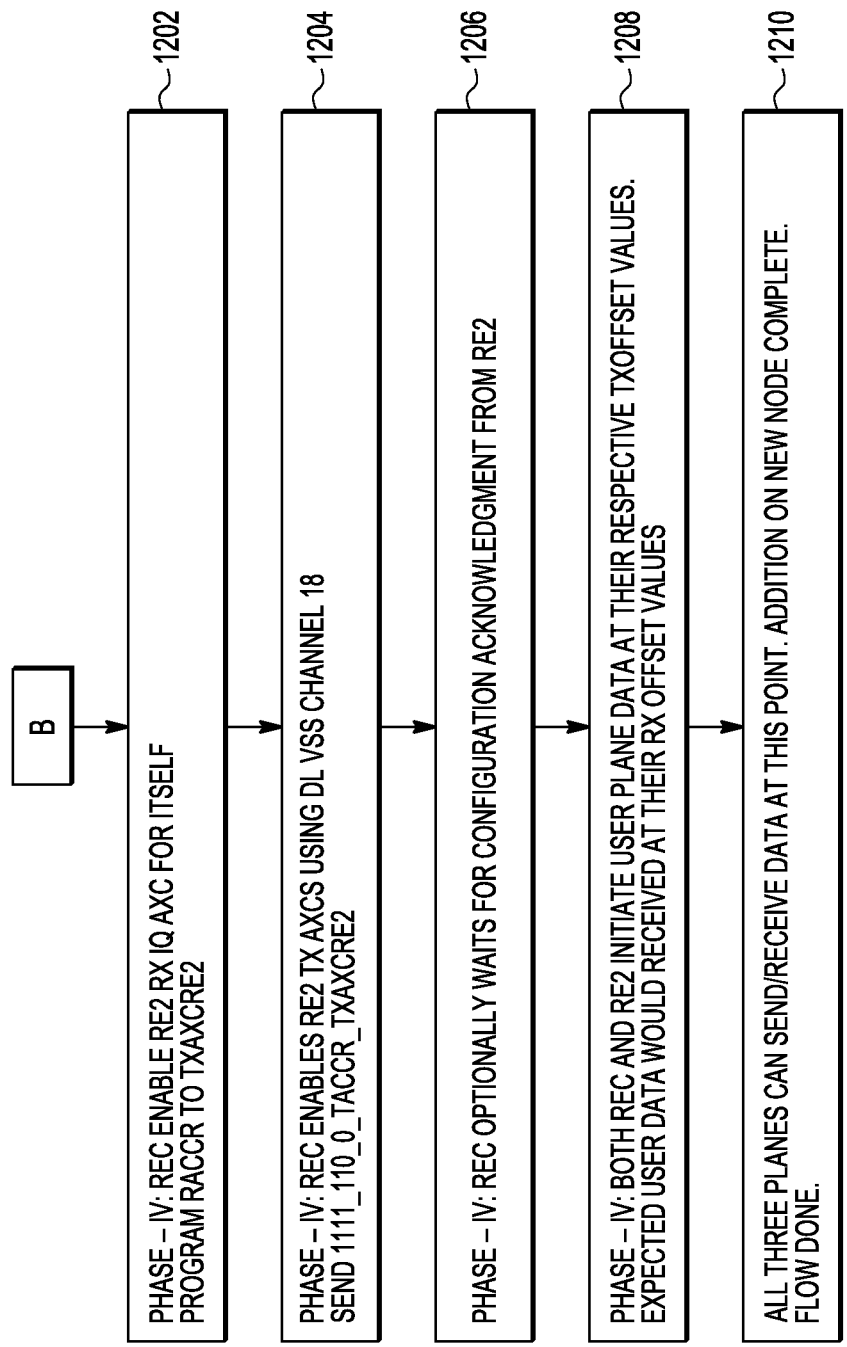
FIG. 12 shows certain steps completing a second and final part of Phase IV.

FIG. 12 shows certain steps completing a second and final part of Phase IV. Continuing from the connecting symbol "B", the REC then assigns IQ data for RE2 in the uplink to further new containers, step 1202. The REC then instructs RE2 to transmit IQ data in these newly assigned UL containers, step 1204. Optionally, the REC may wait for confirmation that RE2 is configured to transmit IQ data on these UL containers, step 1206.

User plane data is then initiated in REC and RE2 at respective Tx offset values. As a result this data may be expected to be received at their Rx respective offset values, step 1208. As a result, the addition of a new node, RE2, is complete—signalling in UL and DL on all three data planes is enabled, step 1210.

As mentioned above, the present invention includes suitable hardware 1010 to calculate the exact timing difference between two CPRI links on a node (RE or REC) in a chain (e.g., step 1004). FIG. 13 shows the timing topology in which timing difference needs to be calculated. FIG. 13 illustrates an exemplary chain having one REC 1300 and a plurality, M, of REs 1302, 1304, 1306, 1308 in a chain. Note that N1, N2, N3, ... N#M are frame differences at each node. The N#M being the frame differences at leaf node RE(M) 1308.

FIG. 14 shows an alternative in which the exemplary chain has four RECs 1400, 1410, 1420, 1430 and at least one RE 1402. In general, it is possible to have X RECs and Y REs in any given daisy chain.

Figure 15:
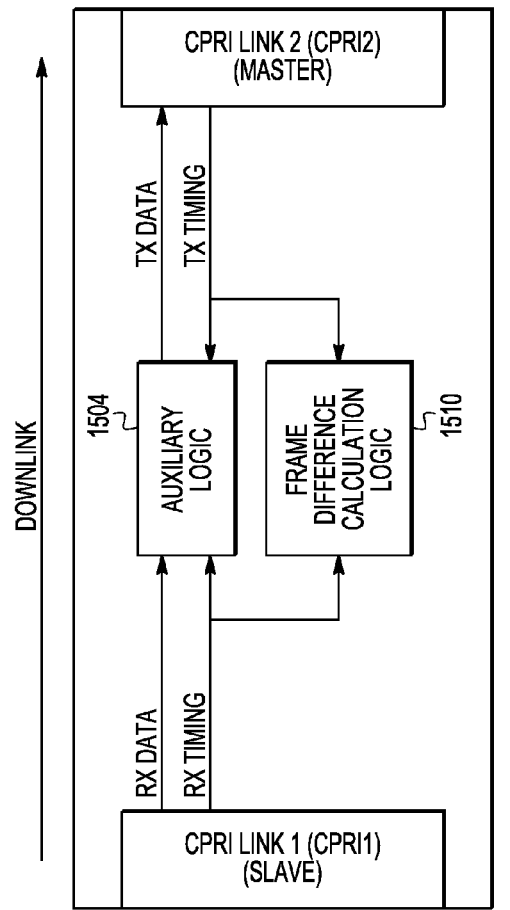
FIG. 15 shows yet another exemplary instance having two CPRI links connected in daisy chain on a CPRI Node (RE/REC)

FIG. 15 shows yet another exemplary instance of a CPRI node (e.g., either an RE or an REC node) having two CPRI Links connected in daisy chain. Here the connections between Rx of CPRI Link 1 and Tx of CPRI Link 2, across the lanes of the CPRI node, are illustrated. The data connection is facilitated by an auxiliary logic interface 1504. Similar connections exist between Rx of CPRI Link 2 and Tx of CPRI Link 1.

In the downlink path (See FIGS. 13 and 14), the same timing information propagates down the chain so the frame difference calculated at a frame difference calculator 1510 is always 0.

In the uplink path, the timing information is looped back from the CPRI slave port of the RE/REC Node but on the receive path of the master port of RE/REC, the timing information arrives after propagating to another node. This timing will be delayed so a timing difference needs to be calculated between two CPRI Links of a RE/REC Node.

The Tx and Rx timing information from two CPRI links contains the following:
Hyper Frame Number—HFN (cpri_tx_hfn, cpri_rx_hfn)
Basic Frame Number—BFN (cpri_tx_x, cpri_rx_x)
Position of data within a basic frame (Sequence Number), (cpri_tx_seq, cpri_rx_seq).

When a basic frame starts, sequence value is zero, so the sequence is used to detect start of a basic frame.

Figure 16:
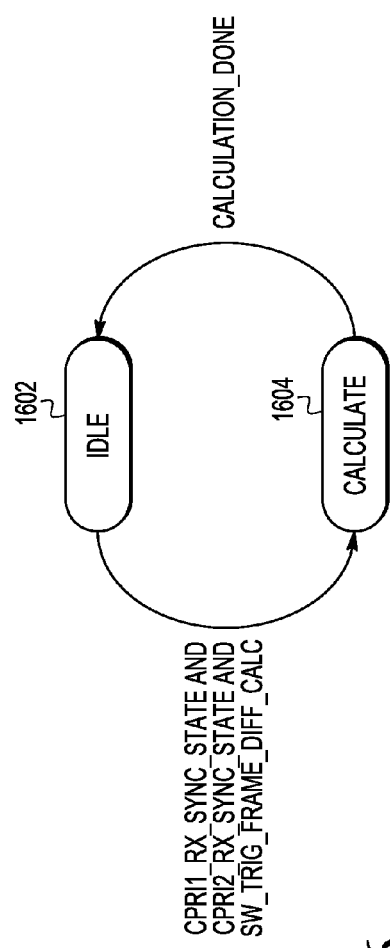
FIG. 16 shows the control path for frame difference.
Figure 17:
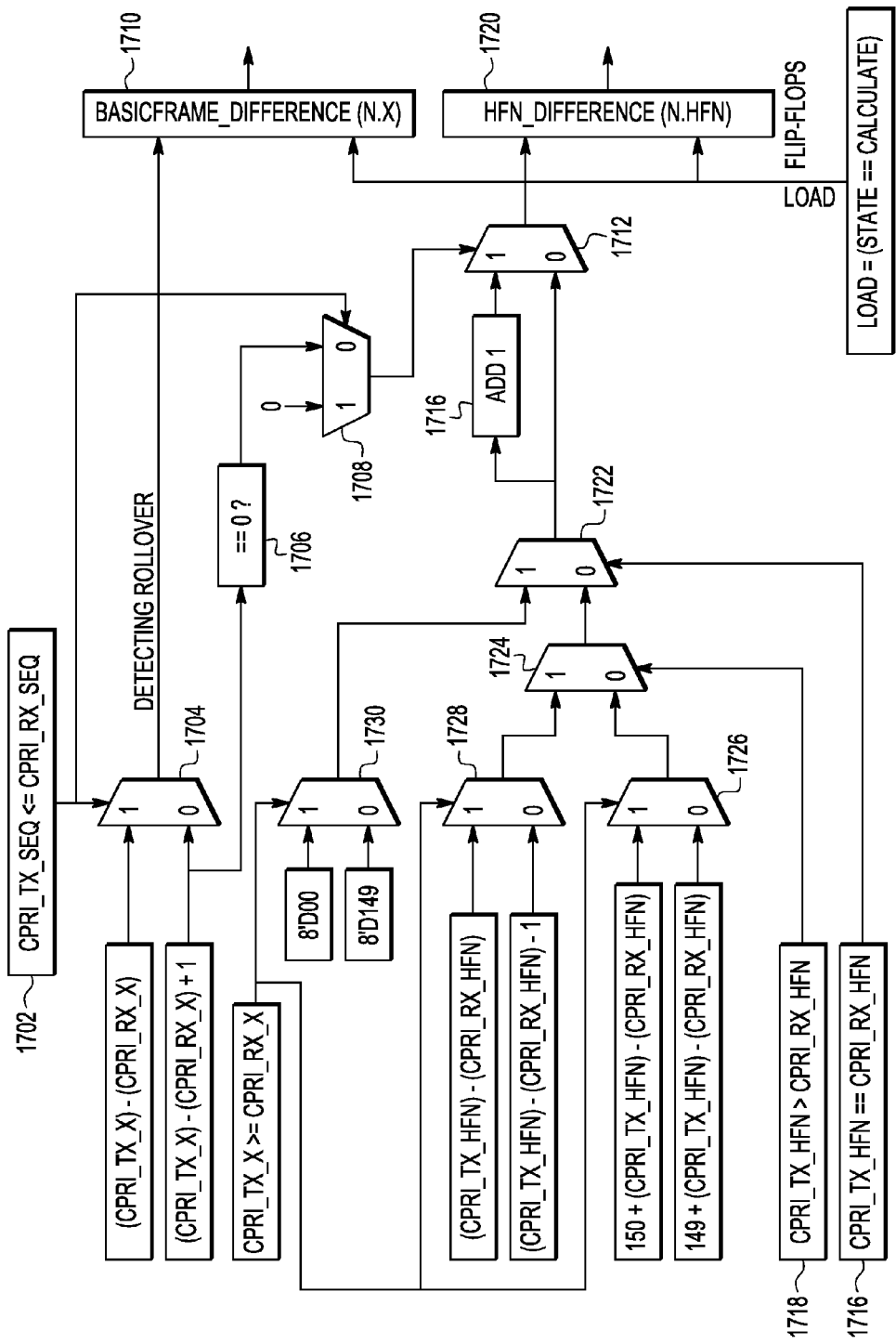
FIG. 17 shows the data path implementation of an exemplary timing difference calculator in accordance with an embodiment of the present invention.

FIG. 16 shows the control path for a frame difference calculator. The calculation is done in "CALCULATE" state 1604. The logic to calculate the frame difference is shown in FIG. 17. Frame difference calculation is started when both framers have achieved synchronization and the trigger for calculating frame difference is set. Once calculation is done, the state machine returns to "IDLE" state 1602.

FIG. 17 shows the data path implementation of an exemplary timing difference calculator. The "cpri_tx_*" and "cpri_rx_*" signals shown are from respective different CPRI framers. This data path results in an accurate measurement of timing differences while limiting the number and/or complexity of hardware components. The final frame difference is stored in registers (such as flip-flops or latches) and can be used later. The reference sign N.X corresponds to the basic frame number, whereas the reference sign N.HFN corresponds to the hyper frame number.

The logic in FIG. 17 includes two elements: a basic frame difference calculator and a hyper frame difference calculator. In the case of the basic frame difference calculator, it is ascertained whether cpri_tx_seq is less than or equal to cpri_rx_seq. If cpri_tx_seq is less than or equal to cpri_rx_seq (i.e., a "1" is applied to multiplexer 1704), then basic frame difference is given by (cpri_tx_x−cpri_rx_x) because the frame difference is slightly less than (cpri_tx_x−cpri_rx_x) otherwise basic frame difference is given by (cpri_tx_x−cpri_rx_x+1).

Cpri_tx_x can actually be less than cpri_rx_x, because, in hardware, subtraction operations are typically unsigned, (cpri_tx_x−cpri_rx_x) and (255−cpri_tx_x+cpri_rx_x) result in same value. The value of basic frame difference calculated here is stored in a first register 1710. As the (cpri_tx_x−cpri_rx_x+1) operation can cause overflow, this overflow is detected at functional block 1706.

A further multiplexer 1708 generates a "1" if cpri_tx_seq is less than or equal to cpri_rx_seq and a "0" otherwise. The output of this gate 1708 is then used to increment hyper frame difference by 1 (at a third multiplexer 1712).

The hyper frame difference calculator calculates an intermediate hyper frame difference, which is then applied to the third multiplexer 1712 directly and incremented by 1 hyper frame (the latter being performed at block 1714).

The intermediate hyperframe difference is calculated as follows:

If (cpri_tx_hfn==cpri_rx_hfn) is determined at block 1716, then Hfn_diff_int is either (8'd0) or (8'd149) depending on whether (cpri_tx_x>=cpri_rx_x) is true or not respectively [multiplexers 1722, 1730].

If however (cpri_tx_hfn>cpri_rx_hfn) is determined at block 1718, Hfn_diff_int is either (cpri_tx_hfn−cpri_rx_hfn) or (cpri_tx_hfn−cpri_rx_hfn−1) depending on whether (cpri_tx_x>=cpri_rx_x) is true or not respectively [multiplexers 1722, 1724, 1728]. Otherwise (i.e., cpri_tx_hfn<=cpri_rx_hfn is determined at block 1718), Hfn_diff_int is either (150+cpri_tx_hfn−cpri_rx_hfn) or (149+cpri_tx_hfn−cpri_rx_hfn) depending on whether (cpri_tx_x>=cpri_rx_x) is true or not respectively [multiplexers 1722, 1724 & 1726].

If rollover was detected in the basic frame difference calculation (i.e., multiplexer 1708 outputs a "1" to multiplexer 1712), then the Hfn_diff_int is incremented (at block 1714) and stored in a second register 1720. Otherwise, Hfn_diff_int value is stored in the second register 1720.

As a result of the various embodiments of the present invention, a CPRI chain becomes easily scalable. Addition of a new node may be achieved completely in runtime without affecting the current active transactions from previous nodes.

The description of the preferred embodiments of the present invention has been presented for purposes of illustration and description, but is not intended to be exhaustive or to limit the invention to the forms disclosed. It will be appreciated by those skilled in the art that changes could be made to the embodiments described above without departing from the broad inventive concept thereof. It is understood, therefore, that this invention is not limited to the particular embodiment disclosed, but covers modifications within the spirit and scope of the present invention as defined by the appended claims.

The invention claimed is:

1. A method for dynamically adding a leaf node to a multi-node base station system having at least one control node and at least one active radio access node, the radio access node having a first lane for receiving data from the control node and transmitting further data to the control node, the method comprising:
   enabling a second lane in the radio access node, the second lane being coupled to a lane of the leaf node;
   in the radio access node, measuring a frame timing difference between the receive timing in an uplink from the leaf node and receive timing in a downlink;
   establishing synchronization between the control node and the leaf node using the measured frame timing difference;
   setting user plane data parameters for the leaf node, thereby initiating transmission of user data to the leaf node; and
   selecting a subchannel for use in communicating instructions to the leaf node, including selecting a unique node identifier, and calculating a unique subchannel value as a function of the node identifier.

2. The method of claim 1, wherein the step of selecting a subchannel further comprises:
   assigning a predetermined first subchannel value to the leaf node; and
   assigning a second subchannel value to the radio access node, the second subchannel value being different from the first subchannel value.

3. The method of claim 1, wherein the step of establishing synchronization comprises:
   transmitting the frame timing difference to the control node;
   calculating a transmission timing offset for the leaf node; and
   transmitting the calculated transmission timing offset to the leaf node using the selected subchannel.

4. A node in a multi-node base station system having at least one control node, the node being in communication with the control node, wherein the node comprises:
   a first lane comprising:
      a first receiver unit for receiving downlink data from the control node in at least one first container;
      a first transmitter unit, including a transmission framer, for transmitting uplink data to the control node;
      a first timer operable to route timings to the first transmitter unit;
      a networking interface; and
      a code word filter unit for forwarding data corresponding to a selected subset of code words;
   a second lane, forming a master port in communication with a leaf node, the second lane comprising:
      a second receiver unit for receiving uplink data from the leaf node;
      a second transmitter unit, including a transmission framer, for transmitting downlink data to the leaf node;
      a second timer operable to route timings to the second transmitter unit;
      a second networking interface; and
      a second code word filter unit for forwarding data corresponding to a selected subset of code words; and
   a timing difference calculator for establishing the timing difference between receive and transmit paths in the respective lanes of the node,
   wherein the timing difference calculator comprises:
      a basic frame difference calculator that calculates the timing difference between receive and transmit paths in units of basic frames;

a hyper frame difference calculator that calculates the timing difference between receive and transmit paths in units of hyper frames; and a multiplexer that increments an output of the hyper frame timing difference calculator when a rollover condition is detected in the basic frame difference calculator.

5. A method for adding a terminating node in a Common Public Radio Interface (CPRI) chain having at least one active networking node, the networking node having at least a first lane and a second lane, the method comprising:

enabling the second lane in the networking node;

instructing the terminating node to set up;

receiving a power up acknowledgement message from the networking node for establishing synchronization between the networking node and the terminating node;

calculating a timing difference between the receive timing in an uplink from the terminating node and receive timing in a downlink;

reporting the timing difference to a radio equipment controller (REC) node;

establishing synchronization between the REC node and the terminating node using the measured timing difference;

setting user plane data parameters for the terminating node thereby facilitating the reception of user plane data from the terminating node; and selecting a subchannel for use in communicating instructions to the terminating node, including selecting a unique node identifier, and calculating a unique subchannel value as a function of the node identifier.

6. The method of claim 5, wherein the networking node is a radio equipment (RE) node or a radio equipment controller (REC) node.

* * * * *